Figure 1:
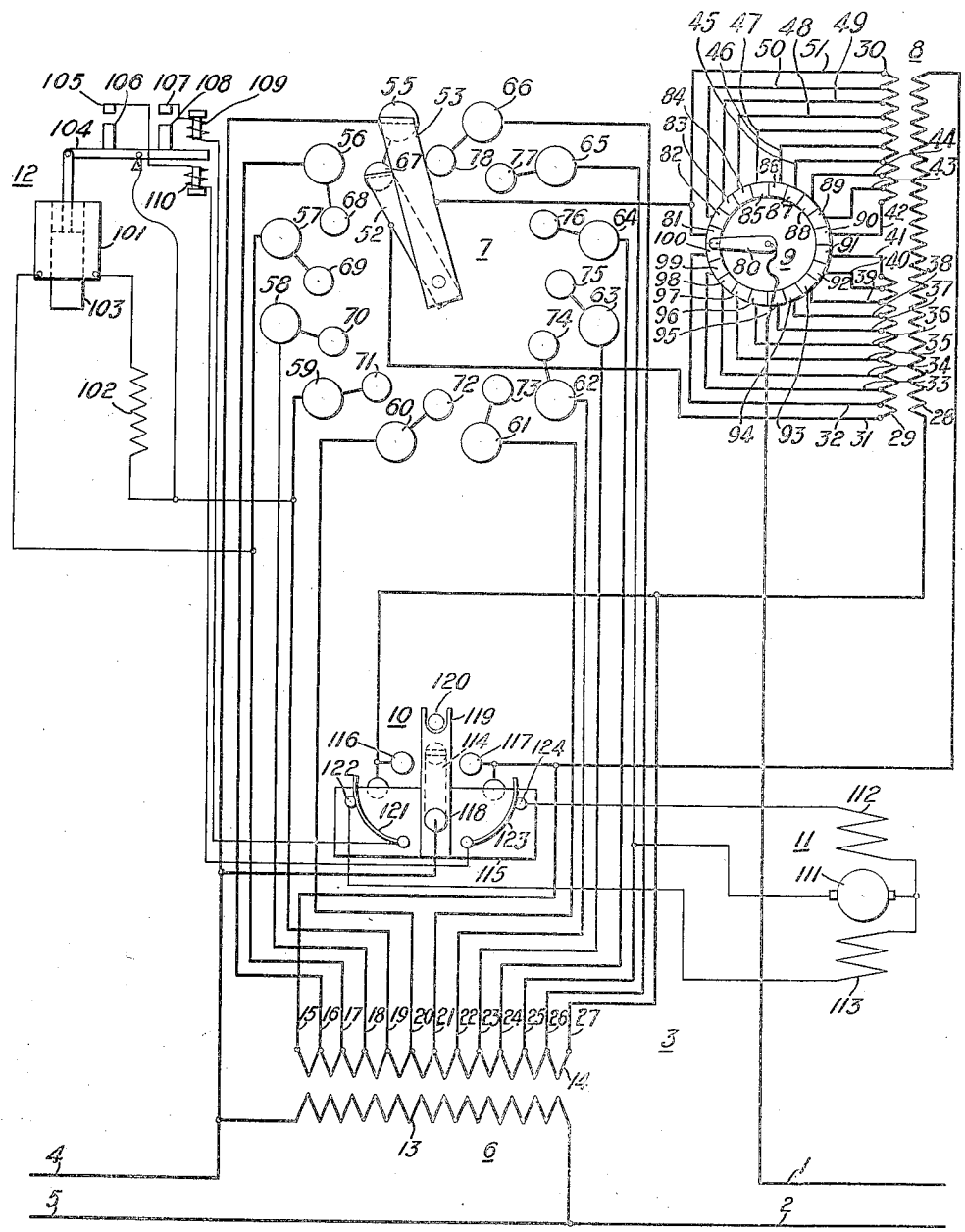

June 26, 1923.

E. LEHR

REGULATOR SYSTEM

Filed May 28, 1919

1,460,161

3 Sheets-Sheet 3

WITNESSES:
H. J. Shelhamer
W. B. Wells.

INVENTOR
Edwin Lehr
BY
ATTORNEY

Patented June 26, 1923.

1,460,161

UNITED STATES PATENT OFFICE.

EDWIN LEHR, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed May 22, 1919. Serial No. 300,393.

*To all whom it may concern:*

Be it known that I, EDWIN LEHR, a citizen of the United States, and a resident of Wilkinsburg, in the county of Allegheny and State of Pennsylvania, have invented a new and useful Improvement in Regulator Systems, of which the following is a specification.

My invention relates to regulator systems and particularly to regulators for governing the voltages on feeder circuits.

One object of my invention is to provide a regulator system that shall be governed in accordance with the voltage obtaining on a supply circuit to maintain substantially constant voltage upon a feeder circuit which is connected to the supply circuit.

Another object of my invention is to provide a supply circuit with a booster transformer, means, comprising an auxiliary transformer, for transferring the supply-circuit connections to include various portions of the booster transformer, and means for governing the operation of said transformers in accordance with the supply-circuit voltage to maintain substantially constant voltage upon a feeder circuit which is connected to the supply circuit.

A further object of my invention is to provide a regulator system comprising a supply circuit, a booster transformer energized by the supply circuit and having a plurality of taps extending from it and adapted to be connected to the supply circuit, an auxiliary transformer energized by the supply circuit and serving to change the supply-circuit connection from one main transformer tap to a second transformer tap without any abrupt changes in voltage, and means controlled by the supply-circuit voltage for governing said transformers to maintain substantially constant voltage upon a feeder circuit which is connected to the supply circuit.

In many electrical systems, and especially in electrical systems utilized for lighting purposes, it is very desirable to maintain constant voltage upon the various feeder circuits but, in case the feeder circuits are located at a considerable distance from the source of supply or from any substation, the regulation to maintain constant voltage on these feeder circuits becomes difficult and, in many cases, impractical. It is possible to compensate at the source of supply for the voltage drop along the line but such compensation is not always satisfactory inasmuch as such means of regulation will only take care of the normal line drop and will not compensate for unusual conditions which cause a change in the line impedance.

In a regulator system constructed in accordance with my invention, a regulator, which may be conveniently mounted upon a pole at any point along the supply circuit, is energized by the supply circuit and is automatically operated, in accordance with the supply-circuit voltage, to maintain substantially constant voltage on the line beyond the point of connection of the regulator.

In a system provided with a regulator constructed in accordance with my invention, a main or booster transformer, having a primary winding connected across the supply circuit and a secondary winding divided into sections by taps and connected in various combinations in series with the supply circuit, an auxiliary transformer comprising a primary winding energized by the supply circuit and two secondary coils, and a voltage relay are provided for maintaining substantially constant voltage upon the supply circuit beyond the point of connection of the regulator.

The sections of the main-transformer secondary winding are successively inserted in, or excluded from, the supply circuit by means of a selector switch which is preferably in the form of a sunflower switch and is operated by a voltage relay in accordance with the voltage obtaining on the supply circuit. A reversing switch is operated in the extreme position of the selector switch to change the connections of the main transformer sections to add to, or subtract from, the supply-circuit voltage. Limit switches are associated with the reversing switch to prevent further operation of the selector switch when it reaches an extreme position.

A transfer switch is associated with the secondary coils of the auxiliary transformer for changing the supply circuit connections from one main transformer tap to an adjacent transformer tap without an appreciable voltage change. The transfer switch is geared to the selector switch, the selector switch, the transfer switch and the reversing switch being controlled by the voltage relay to maintain substantially constant voltage on the supply circuit beyond the point of connection of the booster transformer.

Figure 2:
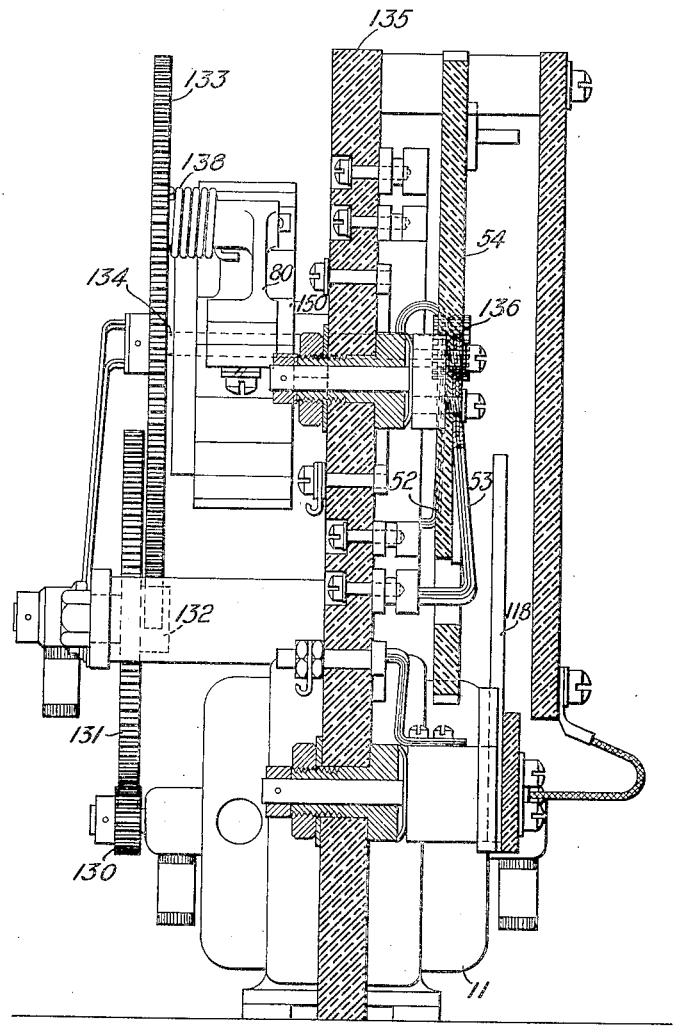
Figure 3:
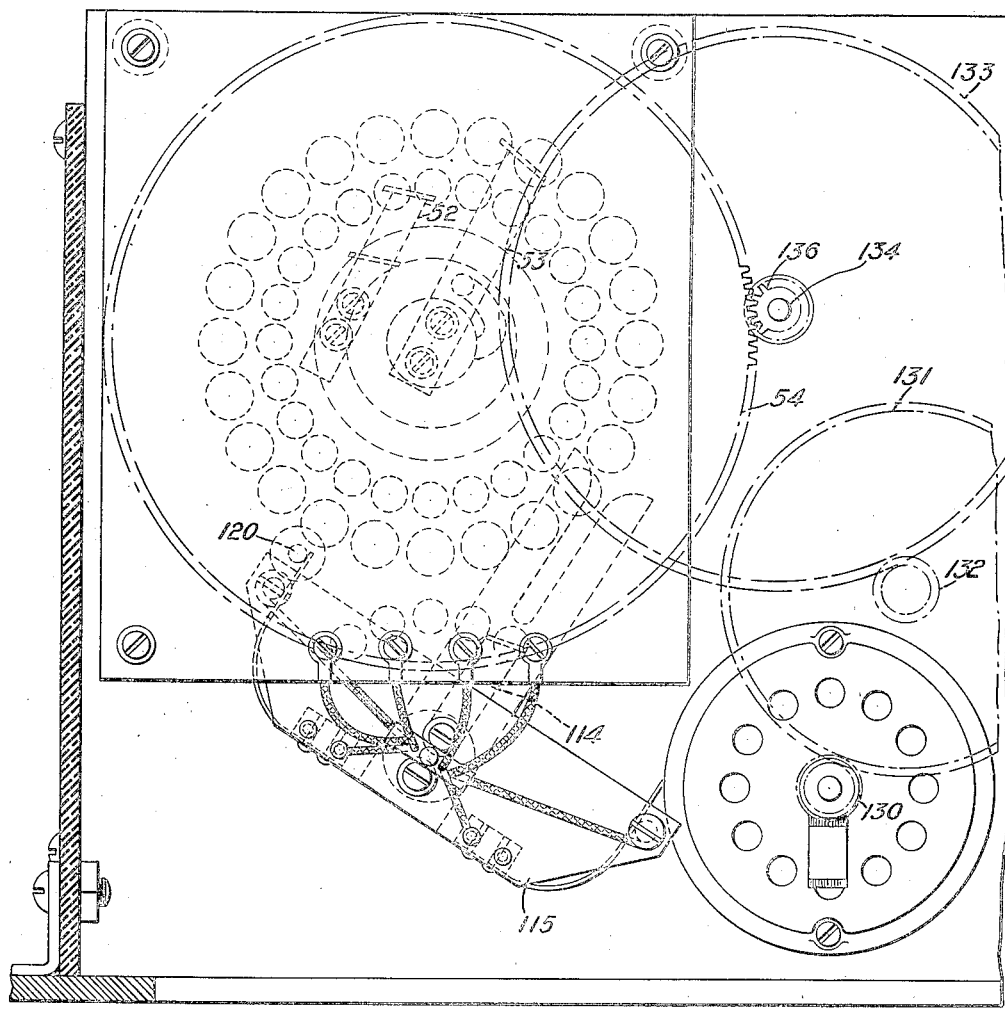

In the accompanying drawing, Figure 1 is a diagrammatic view of a regulator system embodying my invention; and Figs. 2 and 3 are, respectively, side and end elevational views of the regulator shown in Fig. 1 of the drawing.

Referring to the drawing, a supply circuit, comprising conductors 1 and 2, is provided with a regulator 3 for maintaining a substantially constant voltage upon conductors 4 and 5, which may be considered as a feeder circuit or an extension of the supply conductors 1 and 2.

The regulator 3 embodies a main or booster transformer 6 which is controlled by a selector switch 7, an auxiliary transformer 8 which is controlled by a transfer switch 9, a reversing switch 10 which is operated by the selector switch 7, a motor 11 which operates the selector switch 7 and the transfer switch 9, and a voltage relay 12 which governs the operation of the motor 11 in a forward and in a reverse direction.

The main transformer 6 embodies a primary winding 13 which is connected across the supply circuit and a secondary winding 14 having a plurality of taps 15 to 27, inclusive, extending from it. The auxiliary transformer 8 embodies a primary winding 28, which is connected across the secondary winding 14 of the main transformer 6, and a secondary winding comprising two coils 29 and 30. The coil 29 has a plurality of taps 31 to 41, inclusive, extending from it, and the coil 30 has a plurality of taps 42 to 51, inclusive, extending from it.

The selector switch 7, which is best illustrated in Figs. 2 and 3 of the drawing, embodies two contact arms 52 and 53, which are mounted upon a rotatable gear wheel 54 composed of any suitable insulating material. The contact arm 53 is adapted to successively engage the contact members 55 to 66, inclusive, and the contact arm 52 successively engages the contact members 67 to 78, inclusive. The contact terminals 55 and 67 are joined together and to the supply conductor 4, and the contact members 56 to 66, inclusive, and the contact members 68 to 78, inclusive, are joined together in pairs to the taps 16 to 26, inclusive, of the secondary winding 14 of the main transformer. The pairs of contact members, which are successively engaged by the contact arms 52 and 53, are disposed in such manner that the contact arm 52 engages a contact member of a pair of contact members prior to the engagement of the associated contact member by the contact arm 53, for a purpose to be hereinafter set forth.

The transfer switch 9 embodies a rotatable contact arm 80 which successively engages the contact segments 81 to 100, inclusive. The contact segments 81 to 90, inclusive, are respectively connected to the transformer taps 51 to 42, inclusive, of the secondary coil 30, and the contact segments 91 to 100, inclusive, are respectively connected to the taps 41 to 31, inclusive, extending from the secondary coil 29. The contact segment 81 is, moreover, directly connected to the contact arm 53 of the selector switch 7, and the contact arm 80 of the transfer switch is directly connected to the supply conductor 1.

The voltage relay 12 embodies an energizing winding 101, which is connected, through a resistor 102, across the transformer taps 17 and 19 of the main booster transformer 6, and a core armature 103 which is operated in accordance with the energization of the winding 101. The core armature 103 is connected to, and operates, a pivotally mounted contact arm 104 which selectively engages the pairs of contact members 105 and 106 and 107 and 108. Two windings 109 and 110 are connected in series with the pairs of contact members in order to steady the action of the voltage relay and to prevent a chattering action by the contact arm 104.

The motor 11 comprises an armature 111 and two field windings 112 and 113. The field winding 112 is connected in series with the armature 111 across the transformer taps 19 and 25 upon engagement of the contact members 105 and 106 of the voltage relay. Such connection serves to effect clockwise rotation of the motor. The field winding 113 is connected, in series with the armature 111, across the transformer taps 19 and 25 of the main transformer 6, upon engagement of the voltage-relay contact members 107 and 108, to effect counter-clockwise rotation of the motor. The voltage relay 12 is operated, by an increased voltage upon the supply circuit, to connect the contact members 105 and 106 and rotate the motor 11 in a clockwise direction and is operated, by a voltage drop across the supply circuit, to engage the contact members 107 and 108 to effect counter-clockwise rotation of the motor 11. The motor 11, when operated in a clockwise direction, controls the switches 7, 9 and 10 to reduce the voltage across the supply conductors 4 and 5 and, when operated in a counter-clockwise direction, operates such switches to increase the voltage across the supply conductors 4 and 5.

The reversing switch 10 embodies a switch arm 114, which is mounted upon a rotatable insulating plate 115, and contact members 116 and 117 which are engaged by the contact arm 114, according to the position of the switch. An arm 118 is rigidly mounted upon the plate 115 and is provided with a bifurcated end portion 119. A pin 120, which is mounted upon the gear wheel 54 of the selector switch 7, is adapted to engage the bifurcated end portion 119 in the midway position of the selector switch in order to move the switch arm 114 into engagement with the contact members 117 and 116 and raise or lower the voltage across the supply conductors 4 and 5. When the switch arm 114 is in engagement with the contact member 117, current flows through the booster transformer 6 and the auxiliary transformer 8 in a direction to boost the voltage of the current which is supplied to the conductors 4 and 5 and, when the switch arm 114 is in engagement with the contact member 116, current is flowing through the booster transformer and the auxiliary transformer in a direction to lower the voltage of the current which is supplied to the conductors 4 and 5.

The plate 115 further carries two limit switches for opening the circuit of the motor 11 when the selector switch 7 has reached either of its extreme positions. The first limit switch comprises a spring contact member 121, which is held in engagement with a contact member 122, and the second limit switch comprises a switch arm 123, which is normally held in engagement with the contact member 124. The spring arm 121 and the contact member 122 are included in the circuit of the motor field winding 113 and, in case the motor is operating in a counter-clockwise direction and the selector switch 7 is operated to an extreme position, the pin 120, which controls the reversing switch, engages the spring arm 121 for disengaging the spring arm from the contact member 122 to open the motor circuit and prevent further operation of the motor 11 or the selector switch 7 in such direction. The spring arm 123 and the contact member 124 are located in the circuit of the motor field winding 112 and, in case the motor is operating in a clockwise direction and the selector switch has reached an extreme position, the pin 120 engages the spring arm 123 to separate it from the contact member 124 and prevent further operation of the motor 11 and the selector switch 7 in such direction.

Referring to Figs. 2 and 3 of the drawing, the motor 11 is provided with a pinion 130 mounted upon its armature shaft. The pinion 130 engages a gear wheel 131 which has a pinion 132 mounted directly upon it. The gear wheel 131 and the pinion 132 are rotatably mounted, in any suitable manner, upon the frame of the regulator. The pinion 132 meshes with a gear wheel 133 which is mounted upon a shaft 134. The shaft 134 is supported in a plate 135 composed of any suitable insulating material and has a pinion 136 mounted upon it near the end opposite to the gear wheel 133. The pinion 136 meshes with the gear wheel 54 which has the contact arms 52 and 53 mounted upon it. Thus, the motor 11 effects operation of the selector switch 7 by means of the pinion 130, gear wheel 131, pinion 132, gear 133, pinion 136 and the gear wheel 54.

The contact segments 81 to 100, inclusive, of the transfer switch 9 are disposed around the shaft 134 and are rigidly mounted upon the insulating plate 135. The contact arm 80 of the transfer switch 9 is mounted upon the gear wheel 133 and is provided with a spring 138 for holding it in engagement with the contact segments 81 to 100, inclusive. The contact segments 55 to 66, inclusive, and 67 to 78, inclusive, are mounted upon the insulating plate 135 and are disposed within the paths of travel of the contact arms 53 and 52 which are mounted on the gear wheel 54. The gearing between the motor 11 and the selector and the transfer switch is constructed to effect one complete rotation of the switch arm 80 of the transfer switch 9 while the switch arms 52 and 53 of the selector switch 7 are moved from one pair of contact members to an adjacent pair of contact members. In Fig. 3 of the drawing, the insulating plate 115 is shown in an extreme position in order to show the operation of one of the limit switches by means of the pin 120.

The voltage upon the supply conductors 1 and 2 is assumed to vary for any cause and the regulator 3 to operate in a manner to compensate for such variation and maintain a substantially constant voltage upon the conductors 4 and 5. Assuming the various switches to be in the positions shown in Fig. 1 of the drawing and the voltage across the supply conductors 1 and 2 to be reduced below normal value, the energization of the voltage relay is reduced to effect engagement of the contact members 107 and 108. Upon engagement of the contact members 107 and 108, a circuit is completed for the motor 11 from the transformer tap 19, through contact arm 104, contact members 108 and 107, coil 109, spring arm 121, contact member 122, field winding 113 and the armature 111 to the transformer tap 25. The motor 11 is operated in a counter-clockwise direction to effect rotation of the contact arms 52 and 53 of the selector switch 7 in a counter-clockwise direction and rotation of the contact arm 80 of the transfer switch in a clockwise direction. The supply conductor 2 is directly connected to the supply conductor 5 and initially, under the case assumed, the supply conductor 1 is connected to the supply conductor 4 through the contact arm 80, contact segment 81, switch arm 53 and the contact segment 55.

Upon rotation of the switch arm 80 in a clockwise direction, the contact segments 81 to 90 are successively engaged by it to include the various portions of the secondary coil 30 in the circuit between the supply conductors 1 and 4 and, accordingly, increase the voltage across the supply conductors 4 and 5. When the switch arm 80 is in engagement with the contact segment 90 to include the complete coil 30 in the supply circuit, the switch arm 52 is in engagement with the contact segment 68, and the switch arm 114 has been moved into engagement with the contact members 117 by the pin 120, giving the arm 118 a movement of rotation in a clockwise direction.

The engagement of the contact arm 80 with the contact segment 91 completes a circuit that extends from the supply conductor 1 through the contact arm 80, contact segment 91, complete coil 29 of the auxiliary transformer 8, contact arm 52, contact segments 68 and 56, transformer tap 16, transformer tap 15, contact member 117 and the switch arm 114 to the supply conductor 4. Thus, the section of the winding 14 included between the taps 15 and 16 is inserted in the supply circuit simultaneously with the coil 29 of the auxiliary transformer 80. However, in this regard, it should be noted that the winding 30 impresses a voltage upon the supply circuit which is one-half the voltage which may be impressed upon such circuit by any one section of the winding 14 of the main transformer, and the winding 29 impresses a negative voltage upon the supply circuit which is equal to one-half the voltage that may be impressed upon the circuit by any section of the winding 14. Thus, at the time the section of the transformer winding included between the taps 15 and 16 is connected to the supply circuit, the coil 29 is also connected to the supply circuit and opposes the action of the transformer section included between the taps 15 and 16 so that there is substantially no change in voltage on the supply circuit when the contact arm 80 is moved from the contact segment 90 to the contact segment 91. In each case, one-half of the voltage of the section between the transformer taps 15 and 16 is impressed upon the conductors 4 and 5.

Further rotation of the contact arm 80 over contact segments 91 to 100, inclusive, successively excludes the sections of the coil 29 from circuit to gradually increase the voltage until the complete coil 29 is excluded from circuit and the supply conductor 1 is connected to the supply conductor 4 directly through the section of the transformer winding 14 included between the taps 15 and 16. Further rotation of the motor 11 in the counter-clockwise direction successively inserts the various sections of the secondary winding 14 in the supply circuit to raise the voltage across the conductors 4 and 5 to any desired value. The transfer of the supply-circuit connections from each tap of the booster transformer to an adjacent tap is effected by the auxiliary transformer 8 in the same manner as described in tracing the circuits completed during the insertion of the transformer section included between the taps 15 and 16, in each case, the voltage change being effected in a gradual and steady manner.

Assuming the contact arm 114 of the reversing switch 10 to be in engagement with the contact members 117, the contact arms 52 and 53 to be in any intermediate position and an increase above normal voltage to be effected upon the supply conductors 1 and 2, then the voltage relay 12 is operated to connect the contact members 105 and 106. Upon engagement of the contact members 105 and 106, the motor 11 is operated in a clockwise direction, the switch arms 53 and 52 are rotated in a clockwise direction, and the contact arm 80 is rotated in a counter-clockwise direction.

The selector switch 7 and the transfer switch 9 operate in the same manner as heretofore described but in the reverse direction. The coil 29 is gradually inserted in the supply circuit and, at the time any one section of the winding 14 is excluded from the circuit, the winding 30 is inserted in circuit. The winding 30 is then gradually excluded from circuit and the same cycle of operation repeated. In connection with the transfer switch 9, it should be noted that the switch arm 80 is provided with carbon brushes 150 of such resistance value that no detrimental short-circuiting or sparking will be effected in moving from one contact segment to an adjacent contact segment.

In case the switches are in the position shown in Fig. 1 of the drawing and it is necesary to reduce the voltage across the conductors 4 and 5, the motor 11 is rotated in a clockwise direction, in the manner heretoforth set forth. The contact arms 52 and 53 are rotated in a clockwise direction, and the contact arm 114 is moved, by the pin 120, into engagement with the contact members 116. When the contact arm 114 is in engagement with the contact members 116, the main transformer 6 is connected in a manner to lower and not raise the voltage across the conductors 4 and 5. The switches 7 and 9 operate in the same manner as that hereinbefore set forth.

The regulator above described occupies but small space and may be associated with the booster transformer on a pole at any point along a supply circuit and, as described, will automatically operate to maintain substantially constant voltage on the supply circuit beyond the point of connection of the booster transformer.

Modifications in the system and arrangement and location of parts may be made within the spirit and scope of my invention and such modifications are intended to be covered by the appended claims.

I claim as my invention:

1. In a regulator system for a supply circuit, a transformer energized by said supply circuit, and means comprising a relay and an auxiliary transformer controlled thereby for varying the number of active turns of said transformer in accordance with the supply-circuit voltage and for connecting the transformer to the supply circuit to maintain substantially constant voltage on a portion of the supply circuit.

2. In a regulator system for a supply circuit, a transformer having a primary and a secondary winding, said primary winding being connected across the supply circuit, means comprising two differentially related coils for varying the number of active turns of said secondary winding, and means for connecting said active turns to the supply circuit to add to or subtract from the voltage of the supply circuit and maintain substantially constant voltage on the supply circuit beyond the point of connection of said transformer.

3. In a regulator system, the combination comprising a supply circuit, a transformer having a primary winding connected across the supply circuit and a secondary winding having a plurality of sections adapted to be connected in series with the supply circuit, and means, comprising a voltage relay and two differentially related coils, for selectively connecting said transformer sections to the supply circuit to maintain substantially constant voltage on the supply circuit beyond the transformer.

4. In a regulator system for a supply circuit, a transformer having a primary and a secondary winding, said primary winding being connected across the supply circuit, and means, comprising a relay and an auxiliary transformer controlled thereby, for automatically connecting selected portions of said secondary winding in series with the supply circuit to maintain substantially constant voltage on a portion of the supply circuit.

5. In a regulator system for a supply circuit, a transformer having a primary and a secondary winding, said primary winding being connected across the supply circuit and said secondary winding being divided into sections by taps, and automatic means comprising differentially related coils for changing from one of said transformer taps to an adjacent tap without an appreciable voltage change to vary the number of active sections in said secondary winding and for connecting said active sections in series with the supply circuit.

6. In a regulator system for a supply circuit, a transformer having a primary and a secondary winding, said primary winding being connected across the supply circuit, and means automatically controlled in accordance with the supply-circuit voltage for connecting varying portions of said secondary winding in series with the supply circuit without an appreciable change in voltage to maintain substantially constant voltage on a portion of the supply circuit.

7. In a regulator system for a supply circuit, the combination comprising a transformer having a primary winding connected across the supply circuit and an adjustable secondary winding, means comprising a selector switch and an auxiliary transformer for varying the number of active turns in the secondary winding, and means for connecting the active turns of the secondary winding for adding to or subtracting from the voltage on a portion of the supply circuit to maintain the voltage on such portion substantially constant.

8. In a regulator system for a supply circuit, the combination with a transformer having a primary and a secondary winding, said primary winding being connected across the supply circuit, and means for connecting the secondary winding in series with the supply circuit to add to and subtract from the voltage of a portion of the supply circuit, of means comprising an auxiliary transformer for varying the number of active turns in the secondary winding in accordance with the supply-circuit voltage and without an appreciable change in voltage.

9. In a regulator system for a supply circuit, the combination comprising a transformer having a primary and a secondary winding, said primary winding being connected across the supply circuit, means comprising an auxiliary transformer having two differentially related coils controlled by the supply-circuit voltage for connecting said secondary in series with the supply circuit and for varying the number of active turns of the secondary winding included in series with the supply circuit.

10. In a regulator system for a supply circuit, the combination comprising a transformer having a primary and a secondary winding, said primary winding being connected across the supply circuit, means automatically controlled in accordance with the supply-circuit voltage for connecting said secondary winding in series with the supply circuit to increase or decrease the supply-circuit voltage, and for varying the number of active turns in the secondary winding without an appreciable change in voltage to maintain substantially constant voltage on a portion of the supply circuit.

11. In a regulator system for a supply circuit, the combination with a main transformer having a primary and a secondary winding said primary winding being connected across the supply circuit, and said secondary winding having a plurality of taps extending from it, of an auxiliary transformer energized by the supply circuit and having two secondary coils, means for successively connecting one of said auxiliary secondary coils between the supply circuit and one of said main transformer taps, connecting the other auxiliary secondary coil to an adjacent main transformer tap and disconnecting the first coil from circuit, and excluding the second auxiliary transformer coil from circuit.

12. In a regulator system for a supply circuit, the combination with a transformer having a primary and a secondary winding, said primary winding being connected across the supply circuit and the secondary winding having a plurality of sections formed by taps extending from it, and means for connecting the various transformer sections in series with the supply circuit, of an auxiliary transformer having a primary winding energized by the supply circuit and two secondary coils, and means for changing the supply circuit connection from one of said transformer taps to an adjacent transformer tap by connecting one of said auxiliary secondary coils gradually in series with the first tap and the supply circuit, connecting the other auxiliary secondary coils to a second transformer tap, disconnecting the first transformer tap from circuit and excluding the first auxiliary transformer coil from circuit and gradually excluding the second auxiliary coil from the circuit of the second transformer tap.

13. In a regulator system, the combination with a supply circuit, a main transformer provided with a winding having a plurality of taps extending from it, and an auxiliary transformer having a winding comprising a plurality of coils divided into sections formed by taps, both of said windings being energized from said supply circuit, of means for successively connecting the several sections of the auxiliary winding in circuit with each of the sections of the main winding and in series with the supply circuit.

14. In a regulator system, the combination with a supply circuit, a main winding having a plurality of taps extending from it, and an auxiliary winding comprising a plurality of coils divided into sections formed by taps, both of said windings being energized from said supply circuit, of means for selectively connecting the main-winding sections to the supply circuit in various combinations and means for successively connecting the auxiliary winding sections in circuit with each main-winding section.

15. In a regulator system, the combination with a supply circuit, a main winding comprising a plurality of sections formed by taps, and an auxiliary winding comprising two coils each divided into a plurality of sections, of means governed by supply-circuit conditions for connecting various main-winding sections to the supply circuit, and means for successively connecting the sections of the auxiliary coils in circuit with each main-winding section and the supply circuit.

16. In a regulator system, the combination with a supply circuit, a main winding having a plurality of sections formed by taps, and an auxiliary winding comprising a plurality of sections, of a sunflower switch for connecting the various main-winding sections to the supply circuit, a switch operated by the sunflower switch in its extreme position for reversing the connection of the main winding to the supply circuit, a commutator switch geared to said sunflower switch for connecting the auxiliary-winding sections to the main-winding sections, and means for controlling said switches in accordance with the supply-circuit voltage.

17. In a regulator system, the combination with a supply circuit, a main winding having a plurality of sections formed by taps, and an auxiliary winding comprising a plurality of sections, of means comprising a switch for connecting the main-winding sections in various combinations to the supply circuit, means comprising a second switch for connecting the auxiliary-winding sections in various combinations to each main-winding section, means for connecting said switches, and means for operating the switches in accordance with the voltage obtaining upon the supply circuit.

18. In a regulator system, the combination with a supply circuit, a main winding having a plurality of sections formed by taps, and an auxiliary winding comprising a plurality of sections, of a switch for connecting the main-winding sections in various combinations to the supply circuit, a second switch for reversing the main-winding connection to the supply circuit and controlled by said first switch, a third switch geared to said first switch for connecting the auxiliary-winding sections in various combinations to each main-winding section, and means controlled by the line-circuit voltage for governing the operation of said switches.

19. In a regulator system, the combination with a supply circuit, a main winding comprising a plurality of sections formed by taps, and an auxiliary winding comprising a plurality of sections, of means governed in accordance with the supply-circuit voltage for connecting the main-winding sections in various combinations to the supply circuit and for connecting the sections of the auxiliary winding to the main-winding sections successively to change the supply-circuit connection from one main-winding tap to a second main-winding tap.

20. In a regulator system, the combination comprising a supply circuit, a main winding having a plurality of sections formed by taps, an auxiliary winding comprising two coils having a plurality of sections, and means for successively connecting the sections of the first coil in circuit with one of said main-winding taps and in series with the supply circuit, for connecting the other auxiliary coil to an adjacent main-winding tap and to the supply circuit, and disconnecting the first coil from connection with the supply circuit, and for gradually disconnecting the second coil from connection with the second main-winding tap.

21. In a regulator system, the combination with a supply circuit, a main transformer having a primary and a secondary winding, the primary winding being connected across the supply circuit and the secondary winding being divided into a plurality of sections by taps, and an auxiliary transformer having a primary winding energized by the supply circuit and a secondary winding comprising two coils divided into sections, of a rotary selector switch for connecting the main-transformer sections in various combinations, in series with the supply circuit, a reversing switch operated by the selector switch in its extreme positions for reversing the connections of the main-transformer sections to the supply circuit, a rotary transfer switch geared to the selector switch for connecting the auxiliary-transformer coils to assist and to oppose respectively the main-winding sections, a motor for operating said switches, and means for operating said motor in a forward and in a reverse direction in accordance with the supply-circuit voltage.

In testimony whereof, I have hereunto subscribed my name this 21st day of May, 1919.

EDWIN LEHR.